United States Patent [19]
Ganesh et al.

[11] Patent Number: 5,960,329
[45] Date of Patent: Sep. 28, 1999

[54] SYSTEM AND METHOD FOR DETERMINING GUARD ZONE AND GUARD BANDS IN A DIGITAL CELLULAR DUAL MODE NETWORK

[75] Inventors: Rajamani Ganesh, Bedford; Vincent A. O'Byrne, Brighton, both of Mass.

[73] Assignee: GTE Laboratories Incorporated, Waltham, Mass.

[21] Appl. No.: 08/938,079

[22] Filed: Sep. 26, 1997

[51] Int. Cl.$^6$ .................... H04Q 7/32; H04Q 7/20
[52] U.S. Cl. .................... 455/67.1; 455/63; 455/34.1; 455/34.2; 455/423
[58] Field of Search .................... 455/67.1, 67.3, 455/62, 63, 448, 449, 454, 426, 450, 451, 452, 447, 443, 444, 464, 560, 552; 370/331, 332, 335, 336, 337

[56] References Cited

U.S. PATENT DOCUMENTS

| | | | |
|---|---|---|---|
| 5,548,809 | 8/1996 | Lemson | 455/34.1 |
| 5,598,430 | 1/1997 | Hachisuka et al. | 375/216 |
| 5,642,377 | 6/1997 | Chung et al. | 375/200 |
| 5,644,591 | 7/1997 | Sutton | 375/200 |
| 5,708,969 | 1/1998 | Sagey | 375/1 |
| 5,734,068 | 3/1998 | Kotzin et al. | 455/63 |
| 5,799,243 | 9/1998 | Ojaniemi | 455/63 |
| 5,845,209 | 12/1998 | Iwata | 455/423 |
| 5,864,549 | 1/1999 | Honkasalo et al. | 370/335 |

OTHER PUBLICATIONS

Principles of CDMA, http://www.cdg.org/a_ross/Principles.html, p. 1.

Spreading Codes, http://www.cdg.org/a_ross/Spreading.html, p. 1.

Reverse CDMA Channel, http://www.cdg.org/a_ross/Reverse.html, pp. 1–4.

Forward CDMA Channel, http://www.cdg.org/a_ross/Forward.html, pp. 1–5.

Introduction to CDMA, http://www.cdg.org/a_ross/Intro.html, pp. 1–2.

IS–95 CDMA System issues, http://www.ericsson.se/systems/D–AMPS 1900/19 35 36.html, pp. 1–3.

Sivarajan, Kumar N. et al., Channel Assignment in Cellular Radio, CH2379–1/89/0000/0846, IEEE, 1989, pp. 846–850.

Plehn, J., Applied Frequency Assignment, 0–7803–1927–Mar. 1994, IEEE, 1994, pp. 853–857.

*Primary Examiner*—Wellington Chin
*Assistant Examiner*—Simon Nguyen
*Attorney, Agent, or Firm*—Leonard Charles Suchyta

[57] ABSTRACT

An interference analyzing system and method analyze interference in a dual mode system having a digital network overlaid on an analog network. The digital network includes portable units operating within digital cell sites; whereas, the analog network includes mobile units operating within analog cell sites. The interference analyzing system measures the amount of interference caused by and to the portable units, and the amount of interference caused by and to the digital cell sites. The system individually compares these interference amounts to a predetermined threshold. If either of the interference amounts exceeds the predetermined threshold, the system selects one of the analog cell sites for spectrum clearing and determines the amount of spectrum to be cleared from the selected analog cell site.

53 Claims, 15 Drawing Sheets

Frequency Offset from CDMA Nominal Center Frequency (kHz)

Frequency Offset from CDMA Nominal Center Frequency (kHz)

Frequency Offset from CDMA Nominal Carrier Frequency (kHz)

SYSTEM AND METHOD FOR DETERMINING GUARD ZONE AND GUARD BANDS IN A DIGITAL CELLULAR DUAL MODE NETWORK

FIELD OF THE INVENTION

The present invention relates generally to wireless communications systems and more particularly to a method for minimizing interference in a dual mode Code Division Multiple Access (CDMA) system by requiring spectrum clearing of a substantially reduced number of Advanced Mobile Phone System (AMPS) sites.

BACKGROUND OF THE INVENTION

AMPS is an analog system that permits communication by mobile units operating within an analog cell site. CDMA systems, on the other hand, are digital systems that permit communication by portable units operating within a CDMA footprint; i.e., a geographical area offering digital CDMA service. In a dual mode system, the CDMA system is overlaid on an analog AMPS.

Since both systems operate contemporaneously in the dual mode system, some interference inherently occurs. Generally, there are four possible interference mechanisms between the AMPS and CDMA systems both operating in the 800–900 MHz frequency band (i.e., base station transmit frequency in the range of 869–894 MHz and receive frequency in the range of 824–849 MHz): (1) interference from AMPS sites to CDMA portable units; (2) interference from AMPS mobile units to CDMA sites; (3) interference from CDMA portable units to AMPS sites; and (4) interference from CDMA sites to AMPS mobile units.

FIG. 1 is a diagram of interference caused by an AMPS site to CDMA portable units operating within a CDMA footprint. As shown in FIG. 1, an interfering AMPS site located far from the CDMA footprint might still cause interference to CDMA portable units due to the AMPS site's excessive power transmissions, antenna height, or other operating conditions. In addition, if the interfering AMPS site is located close to a body of water, its transmission path across the water has a lower path loss, thereby permitting interference from an AMPS site located at a farther distance away from the CDMA footprint. Any AMPS site that interferes with the CDMA system requires clearing of analog channels from the frequency band being used by the CDMA system. Clearing is an expression commonly used to refer to the action of decommissioning that part of the spectrum from a cell site.

Even if the AMPS site does not cause excessive interference due to a very high path loss to any CDMA portable unit, for example, the path loss from a mobile unit within the AMPS site's serving area may still cause interference to the CDMA system if the path loss between the AMPS mobile unit and the CDMA base station is very low.

FIG. 2 is a diagram of interference caused by an AMPS mobile unit, operating within an AMPS site's serving area, to a CDMA system. In FIG. 2, the interfering AMPS mobile unit crosses a bridge, for example, within the AMPS site's serving area. Because the AMPS mobile unit is located over water, the transmission path across the water has a lower path loss, thereby facilitating interference with the CDMA system. Similar results occur when an AMPS mobile unit transmits from elevated highways, mountain roads, etc.

Conventional systems typically ignore such interference mechanisms. However, all of these interference mechanisms must be considered in a proper analysis of guard zones and guard bands. A guard zone is a geographical area in which cell sites must have a portion of their spectrum cleared to reduce interference between the analog AMPS and the digital CDMA systems. A guard band refers to the amount of spectrum, or frequency, that must be cleared at an AMPS site lying in the guard zone, when the digital and analog systems are overlaid. The size of the frequency band that must be cleared depends on issues such as transmit signal shape and mask and receiver filter structure and mask.

Conventional guard zone and guard band estimation methods are based on tessellated hexagonal grid cellular networks. These systems have found only limited direct application to real cellular network planning. In an analog system, cell sites are arranged in a hexagonal grouping and the "ring" of cell sites around the cell sites under consideration are referred to as tiers of cell sites. The typical result is that one or two tiers of analog cell sites must be cleared of the spectrum in order for the systems to operate over the same frequency band.

These conventional methods are idealistic and based on distance and a single theoretical path loss model. In addition, these methods do not consider factors such as user traffic, land use and land cover constraints, forward link margin (i.e., the value of a CDMA portable unit's forward link margin indicates the additional interference that the system can sustain at the specific location and still meet the link requirement), noise floor elevation (i.e., elevation in the effective noise at the base station due to the other portable units using the same frequency) due to multi-user traffic, or transmitter and receiver filter characteristics typically referred to as masks. Because the conventional methods do not consider these factors, they do not result in very accurate results suitable for real-life CDMA cellular deployments.

Therefore, a need exists in networks to efficiently determine the number of AMPS sites which need clearing of the CDMA frequency band while minimizing interference between the AMPS sites and the overlaid CDMA system.

SUMMARY OF THE INVENTION

Systems and methods consistent with the principles of the present invention address this need by efficiently determining in a dual mode system the AMPS sites lying in the guard zone where the CDMA frequency band needs to be cleared, and the amount of spectrum to be cleared at each AMPS site in the network.

In accordance with the purpose of the invention as embodied and broadly described herein, a system consistent with the principles of the present invention analyzes interference in a dual mode system having a digital network overlaid on an analog network. The digital network includes portable units operating within digital cell sites; whereas, the analog network includes mobile units operating within analog cell sites.

The system measures the amount of interference caused by and to the portable units, and the amount of interference caused by and to the digital cell sites. The system individually compares these interference amounts to a predetermined threshold. If either of the interference amounts exceeds the predetermined threshold, the system selects one of the analog cell sites for spectrum clearing and determines the amount of spectrum to be cleared from the selected analog cell site.

BRIEF DESCRIPTION OF THE DRAWINGS

The accompanying drawings, which are incorporated in and constitute a part of this specification, illustrate an embodiment of the invention and, together with the description, explain the objects, advantages, and principles of the invention. In the drawings.

DETAILED DESCRIPTION OF THE PREFERRED EMBODIMENTS

The following detailed description of the invention refers to the accompanying drawings The description includes exemplary embodiments, other embodiments are possible, and changes may be made to the embodiments described without departing from the spirit and scope of the invention. The following detailed description does not limit the invention. Instead, the scope of the invention is defined by the appended claims.

The following detailed description refers to mobile units as operating within AMPS systems and portable units as operating within CDMA systems. Mobile units differ from portable units by power class. The following detailed description equally applies to portable units operating within AMPS systems and mobile units operating within CDMA systems.

Systems and methods consistent with the principles of the present invention consider interference between each and every possible CDMA portable unit and AMPS mobile unit location and every AMPS and CDMA site in the network. The systems and methods utilize the performance of the CDMA system to make allowances for those geographical areas where the CDMA portable unit is in handoff status, thus being able to better handle interference. The interference analysis consistent with the principles of the present invention is based on the EIA/TIA/IS-95A, IS-97, and IS-98 CDMA standards and the EIA/TIA/IS-19 and IS-20 AMPS standards, the relevant details of which are hereby incorporated by reference.

Figure 1:
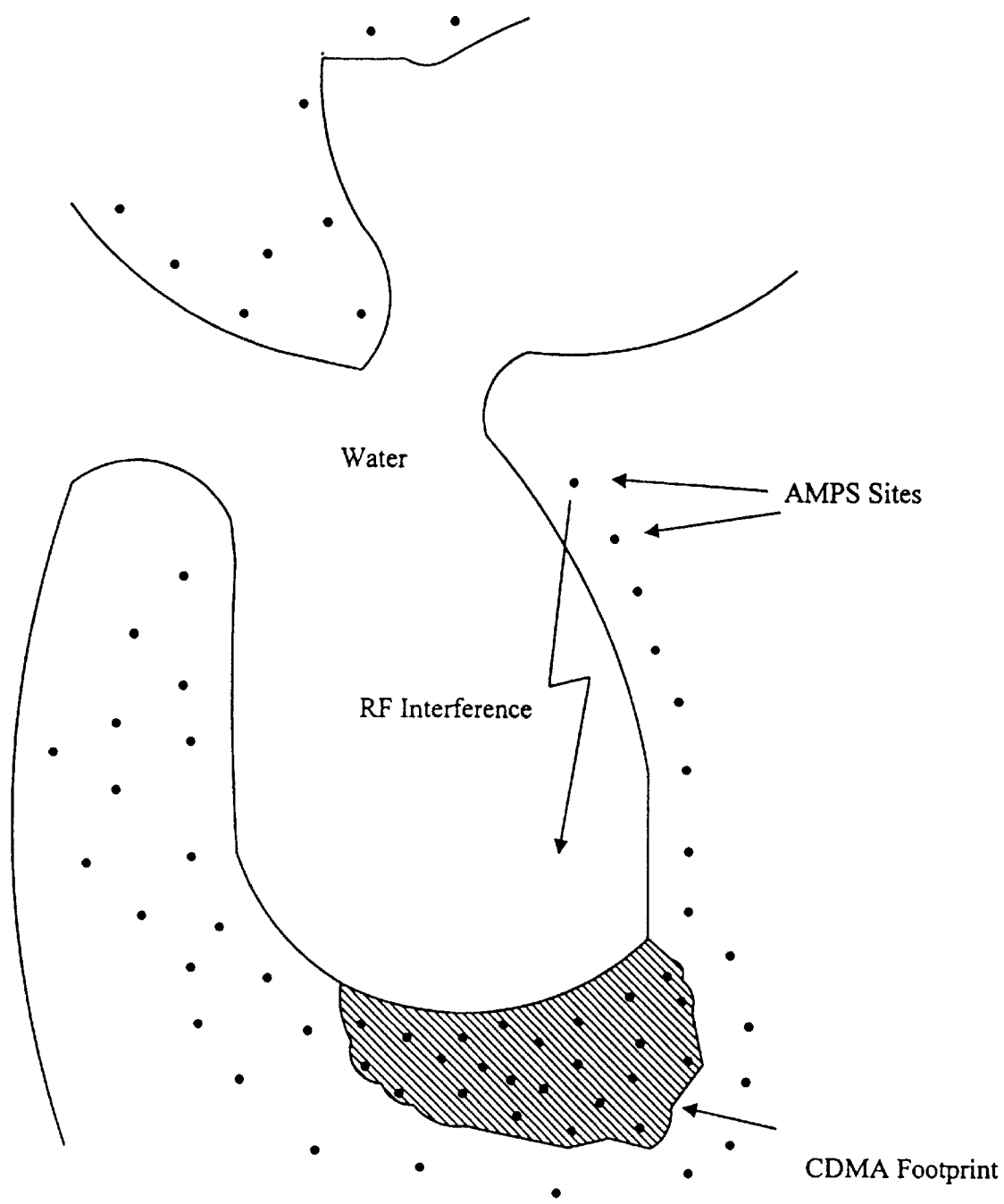
FIG. 1 is a diagram of a dual mode system in which an AMPS site causes interference to CDMA portable units operating within a CDMA footprint that covers only a small portion of the analog system.
Figure 2:
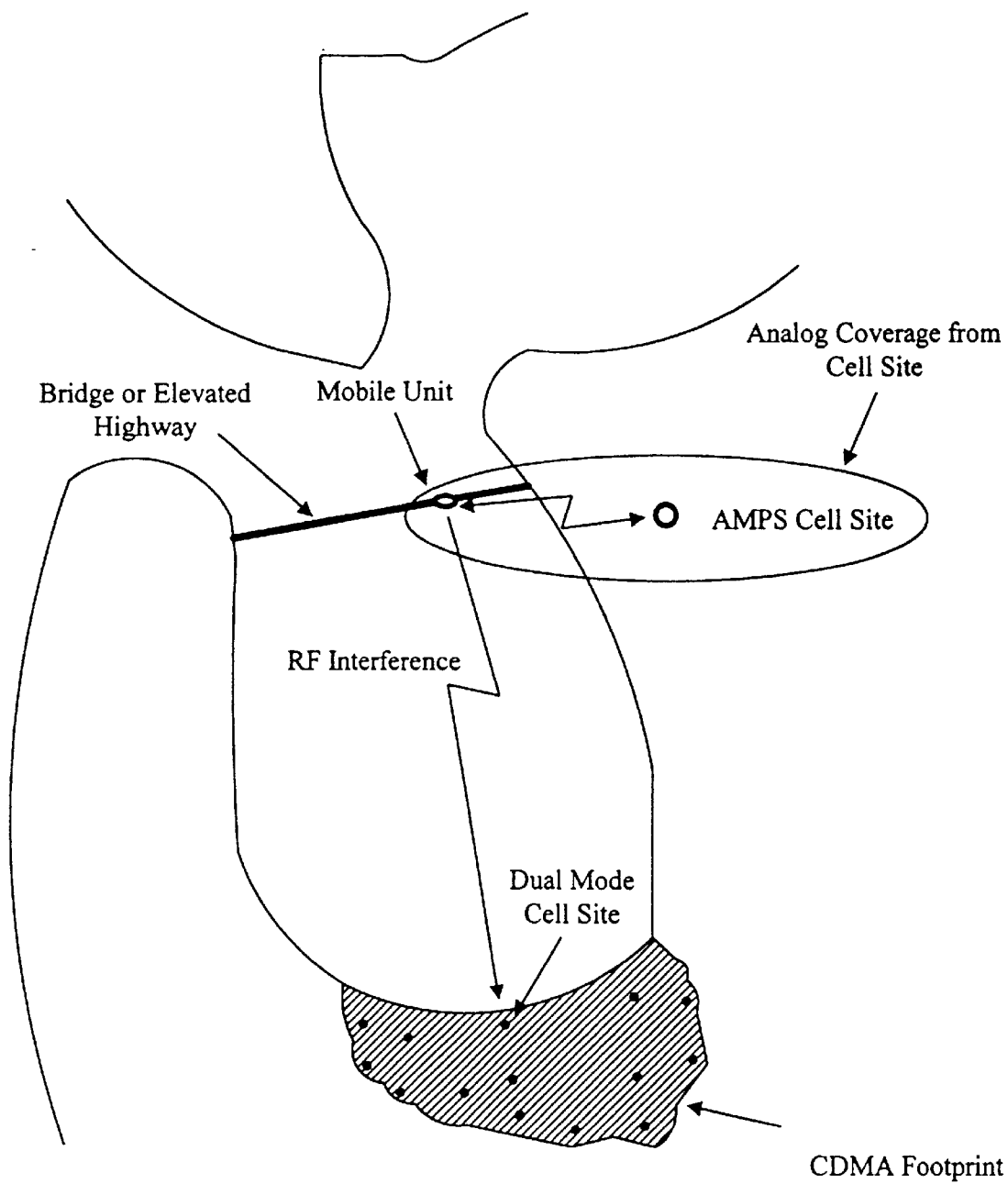
FIG. 2 is a diagram of a dual mode system in which an AMPS mobile unit operating within an AMPS site's serving area causes interference to a CDMA system, and the AMPS site itself may not cause interference to the CDMA system.

FIGS. 1 and 2 are diagrams of a dual mode system. The dual mode system includes a digital CDMA cellular network overlaid on an analog AMPS network. Each network operates concurrently. An interference module analyzes interference between the two networks. The interference analyzing module is a computer, such as a personal computer or a larger main frame computer, that contains all information on both the CDMA and AMPS networks, such as coverage, traffic, etc.

The interference analysis module consistent with the principles of the present invention uses a defined CDMA coverage area in conjunction with the CDMA traffic pattern to create a CDMA footprint for interference analysis. Based on the interference mechanism being analyzed, the interference power is computed at the mobile/portable unit's or site's location and then compared to a threshold which includes the transmitter and receiver filter protection. The threshold is a value or level consistent with a desired service quality objective. If the interference power exceeds this threshold, then the AMPS site is determined to be lying in the guard zone and the amount of spectrum which needs to be cleared at this site is calculated.

The guard zone thresholds for each CDMA portable unit and CDMA site are automatically calculated in the analysis. The threshold for each CDMA portable unit is calculated based on the portable unit's forward link margin. The CDMA sites, on the other hand, use the effective noise floor, including the noise floor elevation due to multi-user traffic, for their guard zone thresholds.

The guard zone thresholds may alternatively be user-supplied. A user may specify fixed guard zone thresholds for the CDMA portable units and sites. These thresholds may range, for example, from −130 dBm to −50 dBm, and are used globally at each CDMA portable unit and CDMA site.

The guard zone analysis studies the four kinds of mutual interference possible between the AMPS and the CDMA systems, including the interference from AMPS sites to CDMA portable units, the interference from AMPS mobile units to CDMA sites, the interference from CDMA portable units to AMPS sites, and the interference from CDMA sites to AMPS mobile units.

The guard band analysis takes into account the transmitter mask requirements and the receiver filter characteristics of the AMPS mobile units and cell sites and the CDMA portable units and cell sites to determine the amount of guard band required at either side of the CDMA frequency band.

Figure 3:
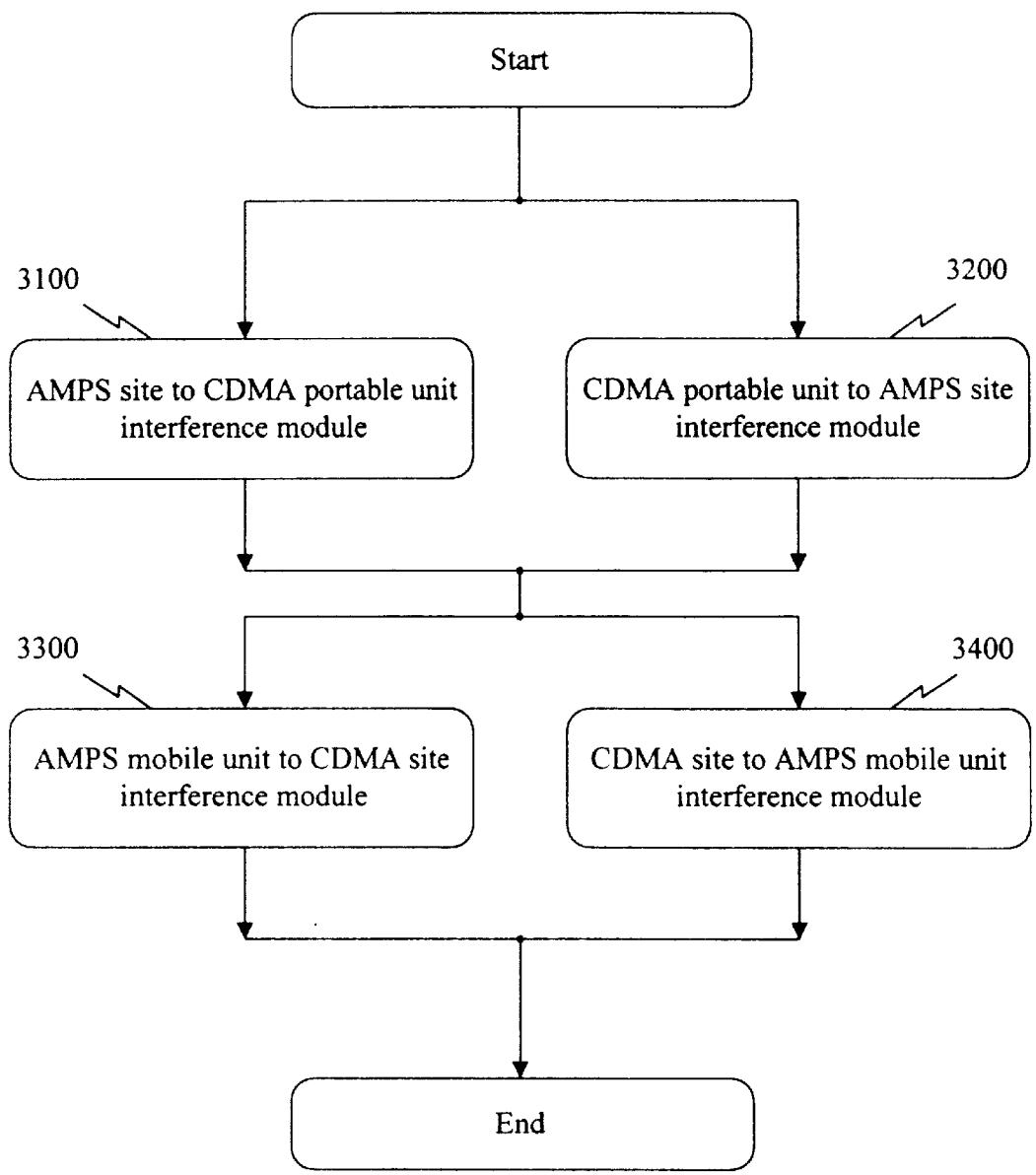
FIG. 3 is a flow chart of an interference analysis method consistent with the principles of the present invention.

FIG. 3 is a flow chart of an interference analysis method executed by the interference analyzing module in an implementation consistent with the principles of the present invention. Prior to executing the method, the interference analyzing module obtains all information regarding the CDMA and AMPS networks, including coverage areas, traffic, etc. The method consists of four interference modules: AMPS site to CDMA portable unit interference module 3100, CDMA portable unit to AMPS site interference module 3200, AMPS mobile unit to CDMA site interference module 3300, and CDMA site to AMPS mobile unit interference module 3400.

To increase processing speed, the method analyzes one of the most dominant interferences, that from an AMPS site to CDMA portable units, in AMPS site to CDMA portable unit interference module 3100 first. AMPS site to CDMA portable unit interference module 3100 determines typically 80 to 95% of the AMPS sites which need clearing. The AMPS mobile units being served by these cleared sites do not need to be processed when analyzing other interference modules, thereby further improving the method's processing speed. In order to even further increase processing speed, the method concurrently analyzes the reverse link interference in CDMA portable unit to AMPS site interference module 3200 while analyzing the forward link AMPS site to CDMA portable unit interference module 3100.

Once the method analyzes forward and reverse link interference in interference modules 3100 and 3200, the method concurrently analyzes reverse and forward interference in AMPS mobile unit to CDMA site interference module 3300 and CDMA site to AMPS mobile unit interference module 3400, respectively. This concurrent analysis further improves the method's processing speed.

Figure 4A:
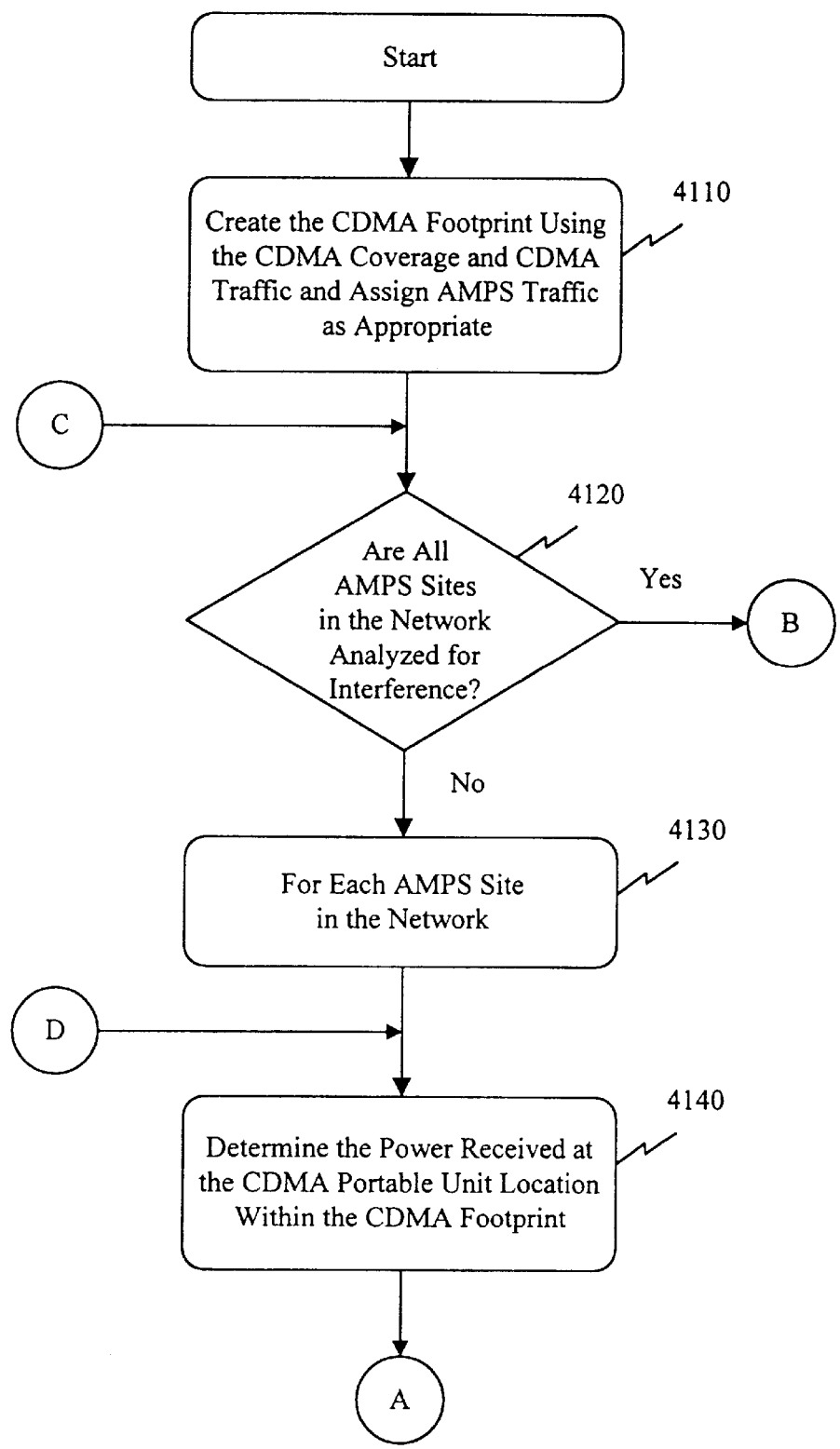
FIGS. 4A and 4B are flow charts of the AMPS site to CDMA portable unit interference module of FIG. 3.
Figure 4B:
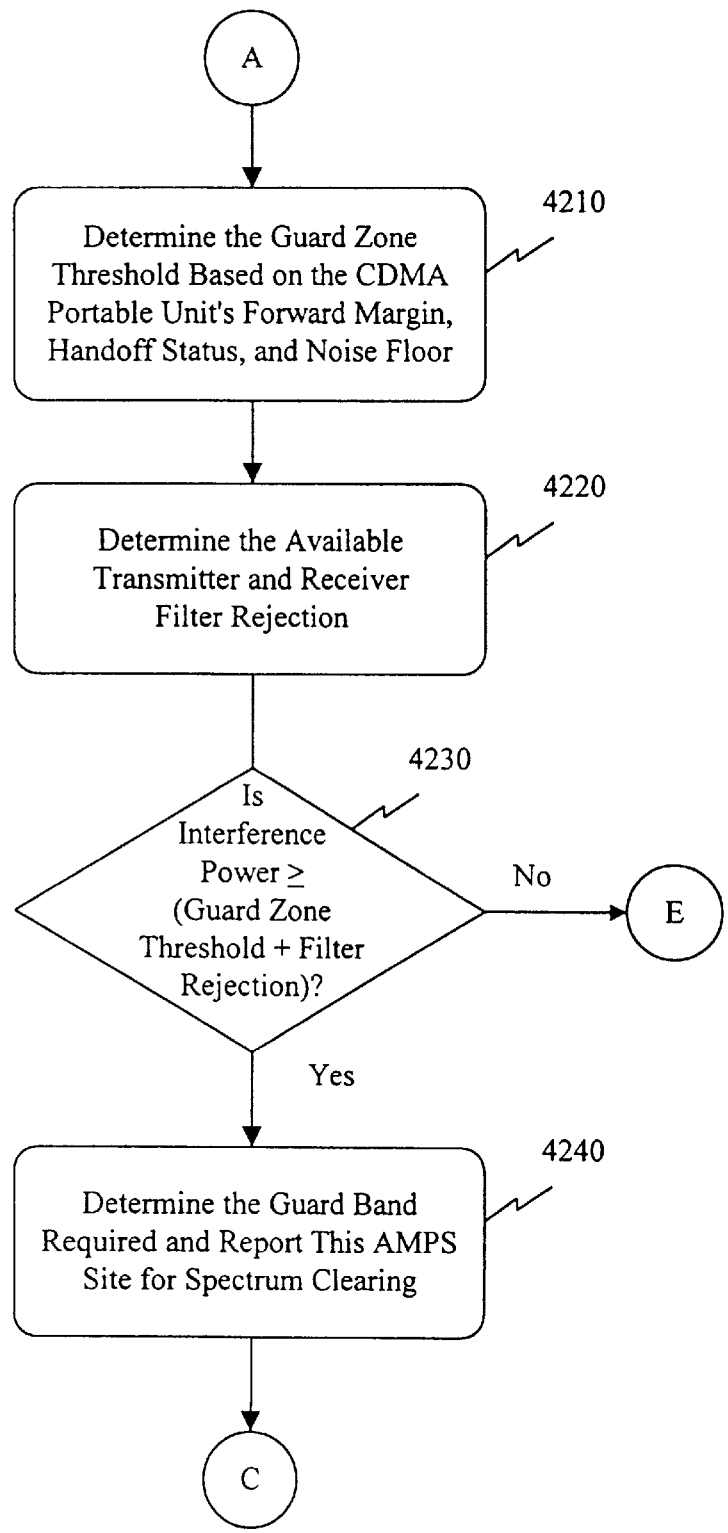

FIGS. 4A and 4B are flow charts of AMPS site to CDMA portable unit interference module 3100. The processing performed by AMPS site to CDMA portable unit interference module 3100 begins by creating a CDMA footprint and assigning traffic to the AMPS sites [step 4110]. Module 3100 creates the CDMA footprint by combining the CDMA coverage layer and the CDMA traffic layer. This serves to remove unwanted portable unit locations which have not been assigned traffic based on the Land Use Land Cover (LULC) categories present over the coverage area. In other words, only those CDMA portable unit locations that have a non-zero amount of Erlang traffic are considered in the analysis. This ensures that no AMPS sites that are unlikely to cause interference are cleared.

In addition to creating the CDMA footprint, module 3100 assigns traffic (Erlangs/sector) to the AMPS sites. The AMPS traffic assignment is used to determine whether a mobile unit exists at a certain location, and might be arbitrarily set by module 3100 or user-defined.

Next, module 3100 determines whether all of the AMPS sites in the network have been analyzed for interference [step 4120]. If some of the AMPS sites have not been analyzed, module 3100 performs analysis for each AMPS site in the network [step 4130]. Module 3100 begins the AMPS site analysis by computing the interference power from a selected AMPS site received at every CDMA portable unit location within the CDMA footprint [step 4140]. For a portable unit location under consideration, module 3100 calculates the guard zone threshold based on the forward margin available, the handoff status, and the thermal noise floor [step 4210] (FIG. 4B). Module 3100 then determines the appropriate filter rejection based on the AMPS site's transmitter mask and the CDMA portable unit's receiver filter characteristics [step 4220].

Module 3100 determines whether the AMPS site causes interference to a CDMA portable unit by determining whether the interference power from the AMPS site is greater than or equal to the combination of the guard zone threshold and the filter rejection [step 4230]. This determination is expressed as follows:

$$\text{Interference power from AMPS site} \geq (m_f - 1)N_p - F_{CDMA\_p}(f) - T_{AMPS\_s}(f) - X \text{ dB,} \quad (1)$$

where $(m_f-1)N_p-X$ dB represents the guard zone threshold for the CDMA portable unit, $m_f$ represents the forward link margin and is defined as the amount of increase that can be applied to the thermal noise floor at a specific location of the network so that the observed Eb/No still meets the minimum Eb/No link requirement (Eb/No represents a ratio of the bit energy of the signal to the noise density in 1 Hz of bandwidth, and a minimum Eb/No is associated with any link for the system to operate satisfactorily), $N_p$ is the CDMA portable unit's thermal noise floor, $F_{CDMA\_p}$ (f) is the CDMA portable unit's receiver filter rejection (FIG. 5), and $T_{AMPS\_s}$ (f) is the AMPS site's transmitter filter rejection which is assumed ideal and constant across the 30 kHz bandwidth. The X dB decrease in expression (1) ensures that the resulting elevation in the portable unit's noise floor due to the AMPS interference is only a trivial fraction of a dB. X can be set to levels of 6–10 dB, for example, to ensure that the interference is at a tolerable level.

Figure 5:
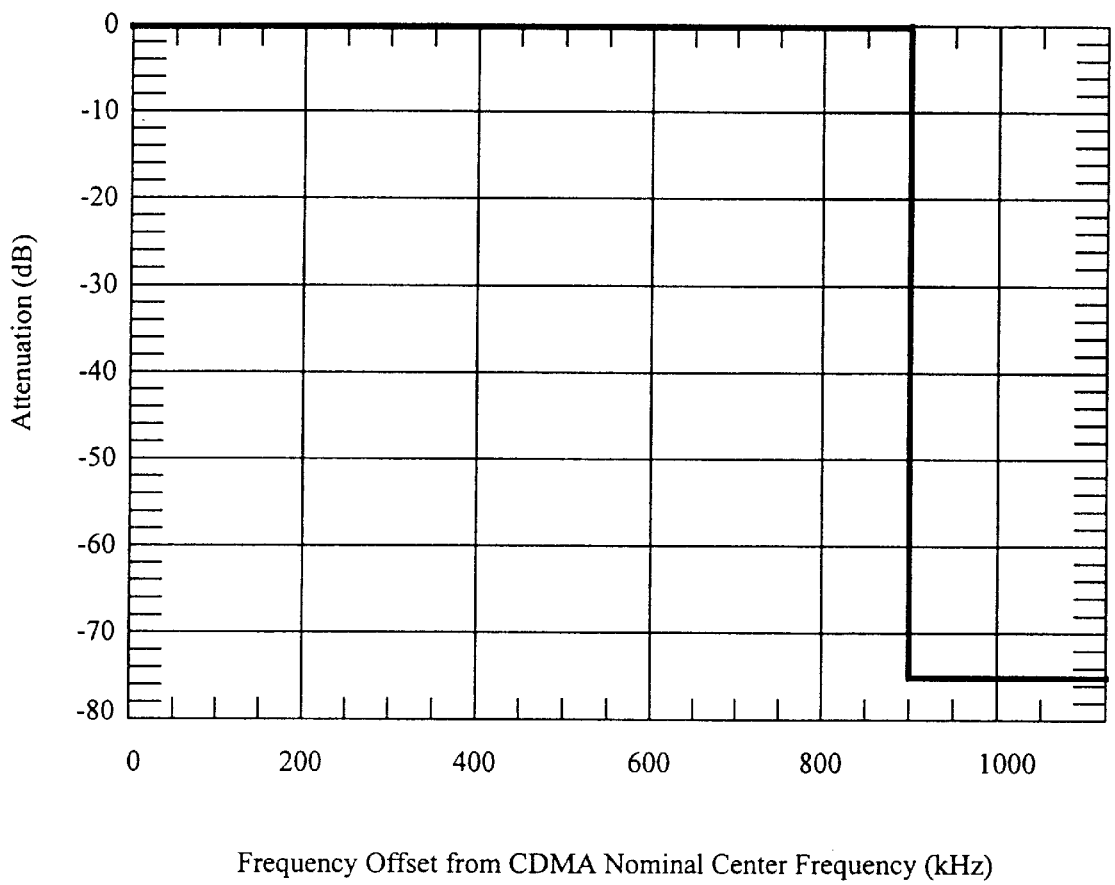
FIG. 5 is a graph depicting a CDMA portable unit's receiver filter characteristics in an implementation consistent with the principles of the present invention.

FIG. 5 is a graph of the CDMA portable unit's receiver filter characteristics in an implementation consistent with the principles of the present invention. The graph shows that the receiver filter characteristics are constant across the CDMA bandwidth of 1.7688 MHz, which includes a 270 kHz guard band on either side of the CDMA frequency band of 1.2288 MHz, used in the guard zone analysis.

If the interference power from the AMPS site is greater than or equal to the combination of the guard zone threshold and the filter rejection, module 3100 determines the guard band required based on the CDMA portable unit's receiver filter characteristics in FIG. 5, and reports the AMPS site for spectrum clearing [step 4240]. Based on the information from FIG. 5, module 3100 determines that the entire Band 1 needs to be cleared. Band 1 is a 1.7688 MHz frequency band defined as 884.4 kHz on either side of the CDMA carrier frequency, and approximately equivalent to 59 AMPS channels. The AMPS site's out-of-band spurious emissions falling into the CDMA carrier frequency are negligible compared to the AMPS carrier power received by the CDMA portable unit. After reporting the AMPS site for spectrum clearing, module 3100 returns to step 4120 (FIG. 4A) where it determines whether all AMPS sites in the network have been analyzed for interference.

Figure 6A:
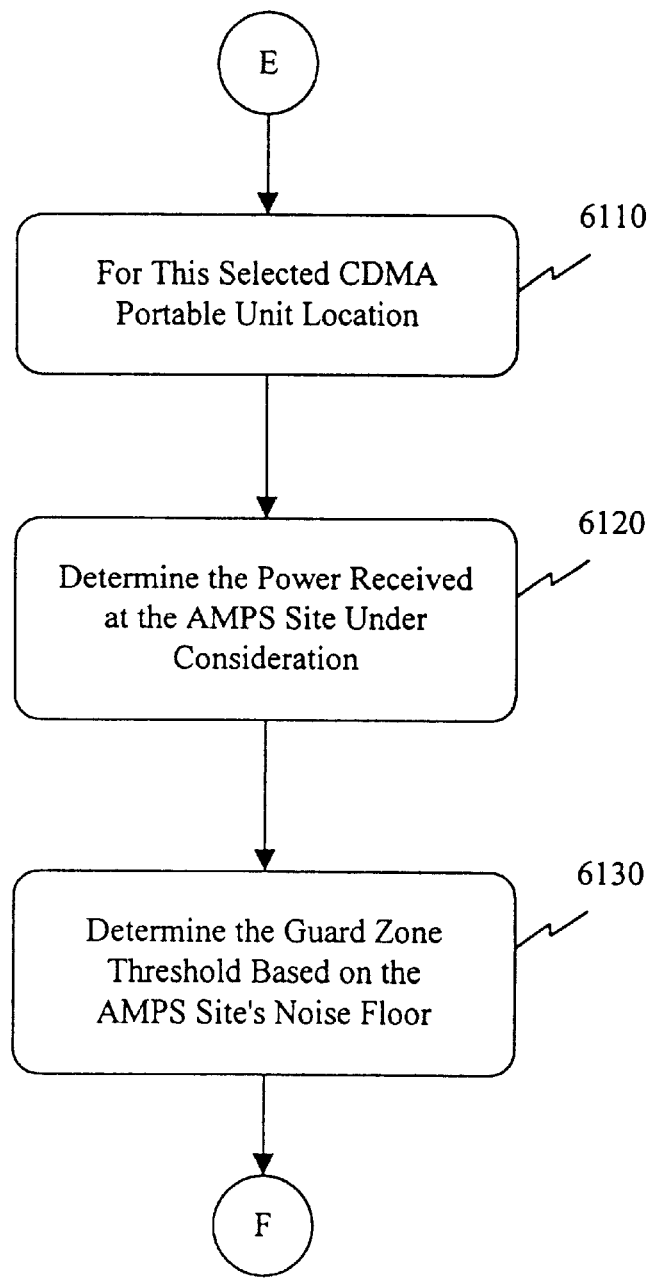
FIGS. 6A and 6B are flow charts of the CDMA portable unit to AMPS site interference module of FIG.3.
Figure 6B:
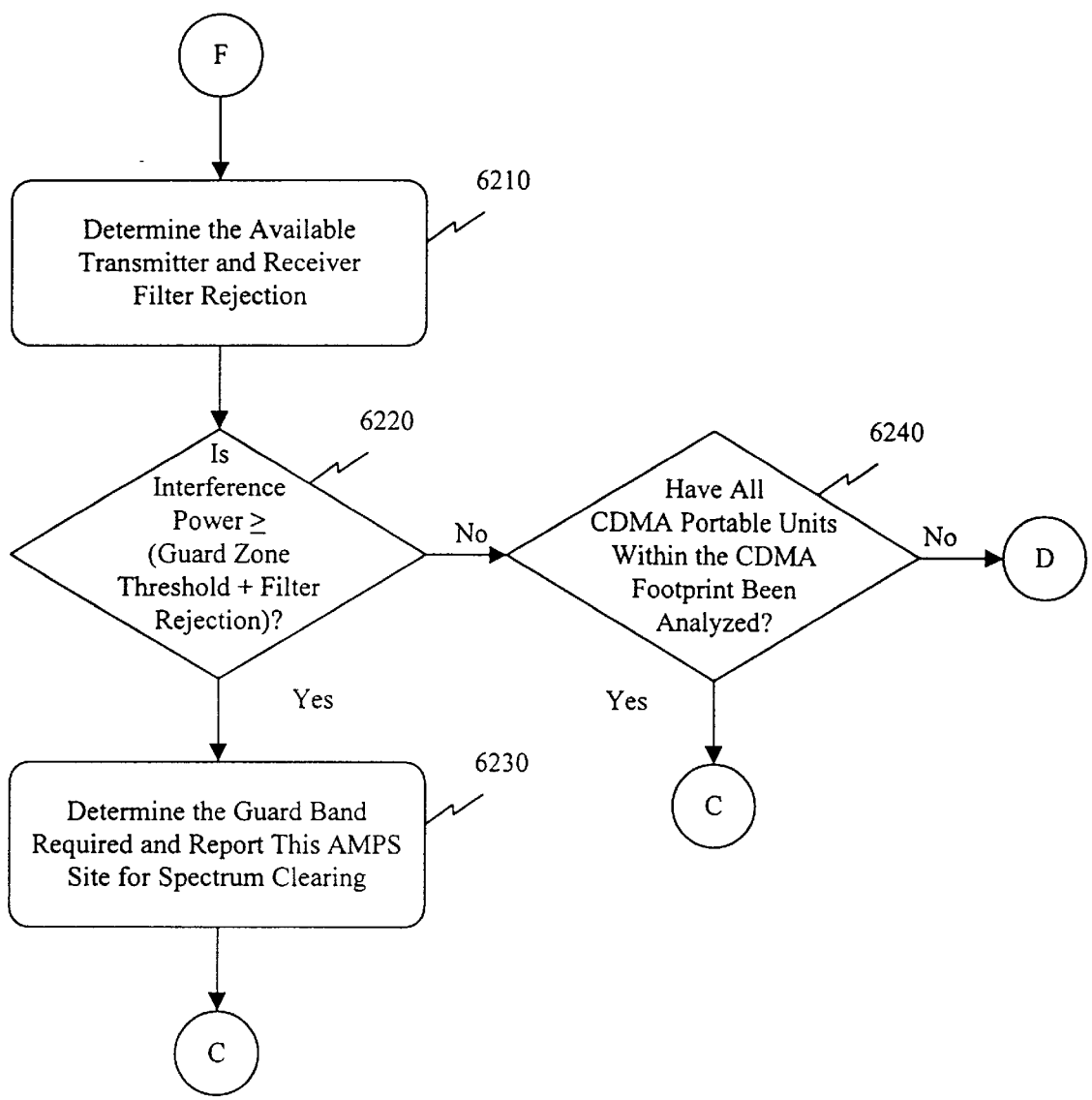

If the interference power from the AMPS site is less than the combination of the guard zone threshold and the filter rejection, however, module 3100 calls CDMA portable unit to AMPS site interference module 3200 (FIG. 6A). CDMA portable unit to AMPS site interference module 3200 performs analysis for each possible CDMA portable unit location in the network [step 6110]. Module 3200 begins the analysis by calculating for the selected CDMA portable unit location, the interference power from the CDMA portable unit at every AMPS site [step 6120]. For an AMPS site under consideration, module 3200 calculates the guard zone threshold based on the AMPS site's noise floor [step 6130]. Module 3200 then determines the appropriate transmitter and receiver filter rejection based on the AMPS site's receiver filter and the CDMA portable unit's transmitter mask characteristics [step 6210] (FIG. 6B).

Module 3200 determines whether the CDMA portable unit causes interference to an AMPS site by determining whether the interference power from the CDMA portable unit is greater than or equal to the combination of the guard zone threshold and the filter rejection [step 6220]. This determination is expressed as follows:

$$\text{Interference power from CDMA portable unit} \geq N_{AMPS\_site} - F_{AMPS\_S\_RF}(f) - T_{CDMA\_P\_RF}(f) - X \text{ dB,} \quad (2)$$

where $N_{AMPS\_site}-X$ dB represents the guard zone threshold for the AMPS site, $N_{AMPS\_site}$ is the AMPS site's noise floor, $T_{CDMA\_P\_RF}$ (f) is the CDMA portable unit's transmitter mask requirement (FIG. 7), and $F_{AMPS\_S\_RF}$ (f) is the AMPS site's receiver filter rejection which is assumed to be ideal and constant across the 30 kHz band, and X, as in expression (1), ensures that the resulting interference is at a tolerable level.

Figure 7:
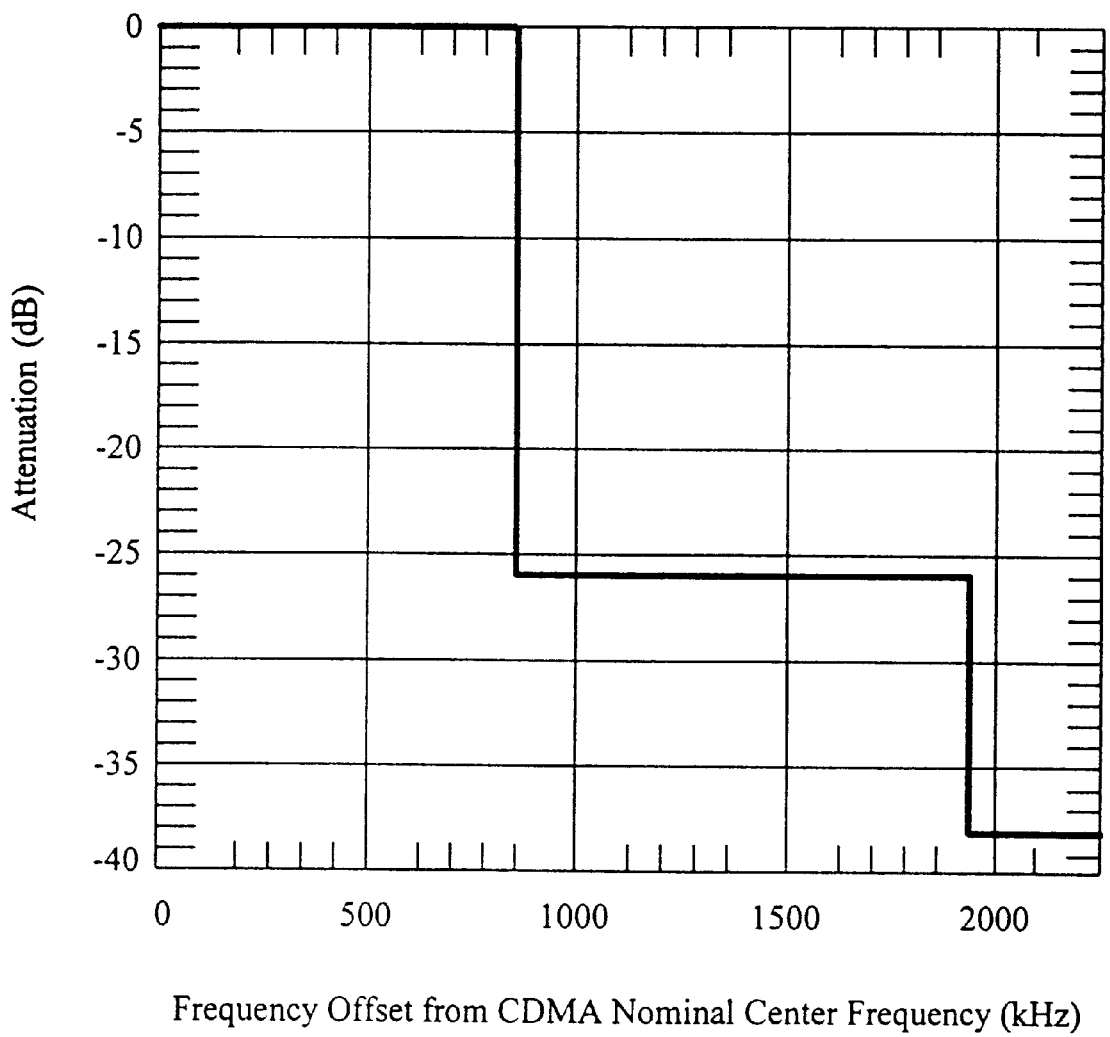
FIG. 7 is a graph depicting a CDMA portable unit's transmitter mask requirement in an implementation consistent with the principles of the present invention.

FIG. 7 is a graph of a CDMA portable unit's transmitter mask requirement in an implementation consistent with the principles of the present invention. The graph shows that the CDMA portable unit's transmitter mask is constant across the CDMA bandwidth of 1.7688 MHz, which includes a 270 kHz guard band on either side of the CDMA frequency band of 1.2288 MHz used in the guard zone analysis.

If the interference power from the CDMA portable unit is greater than or equal to the combination of the guard zone threshold and the filter rejection, module 3200 determines the guard band required based on the CDMA portable unit's transmitter mask requirement in FIG. 7, and reports the AMPS site for spectrum clearing [step 6230]. Based on the information from FIG. 7, module 3200 determines that the entire Band 1 needs to be cleared. Module 3200 then calls module 3100 at step 4120 (FIG. 4A), where module 3100 determines whether all AMPS sites in the network have been analyzed for interference.

If the interference power from the CDMA portable unit is less than the combination of the guard zone threshold and the filter rejection, however, module 3200 determines whether all CDMA portable units within the CDMA footprint have been analyzed [step 6240]. If some of the CDMA portable units have not been analyzed, module 3200 calls module 3100 at step 4140 (FIG. 4A), where module 3100 determines the power received at the next CDMA portable unit location within the CDMA footprint.

Figure 8A:
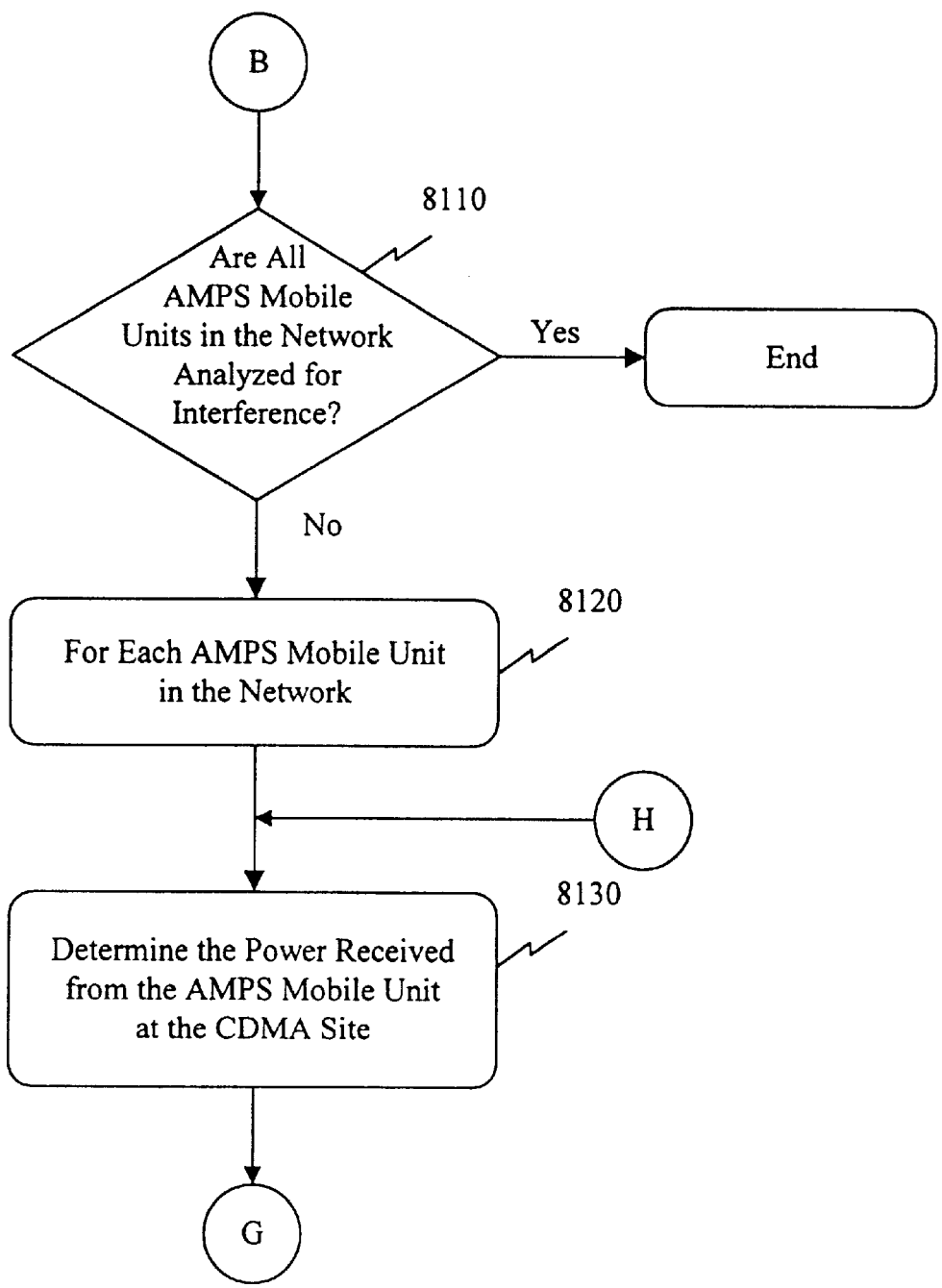
FIGS. 8A and 8B are flow charts of the AMPS mobile unit to CDMA site interference module of FIG. 3.

If all of the CDMA portable units have been analyzed, however, module 3200 calls module 3100 at step 4120 (FIG. 4A), where module 3100 determines whether all of the AMPS sites in the network have been analyzed. If all of the AMPS sites have been analyzed for interference, module 3100 calls AMPS mobile unit to CDMA site interference module 3300 (FIG. 8A). AMPS mobile unit to CDMA site interference module 3300 begins by determining whether all of the AMPS mobile units in the network have been analyzed for interference [step 8110].

Figure 8B:
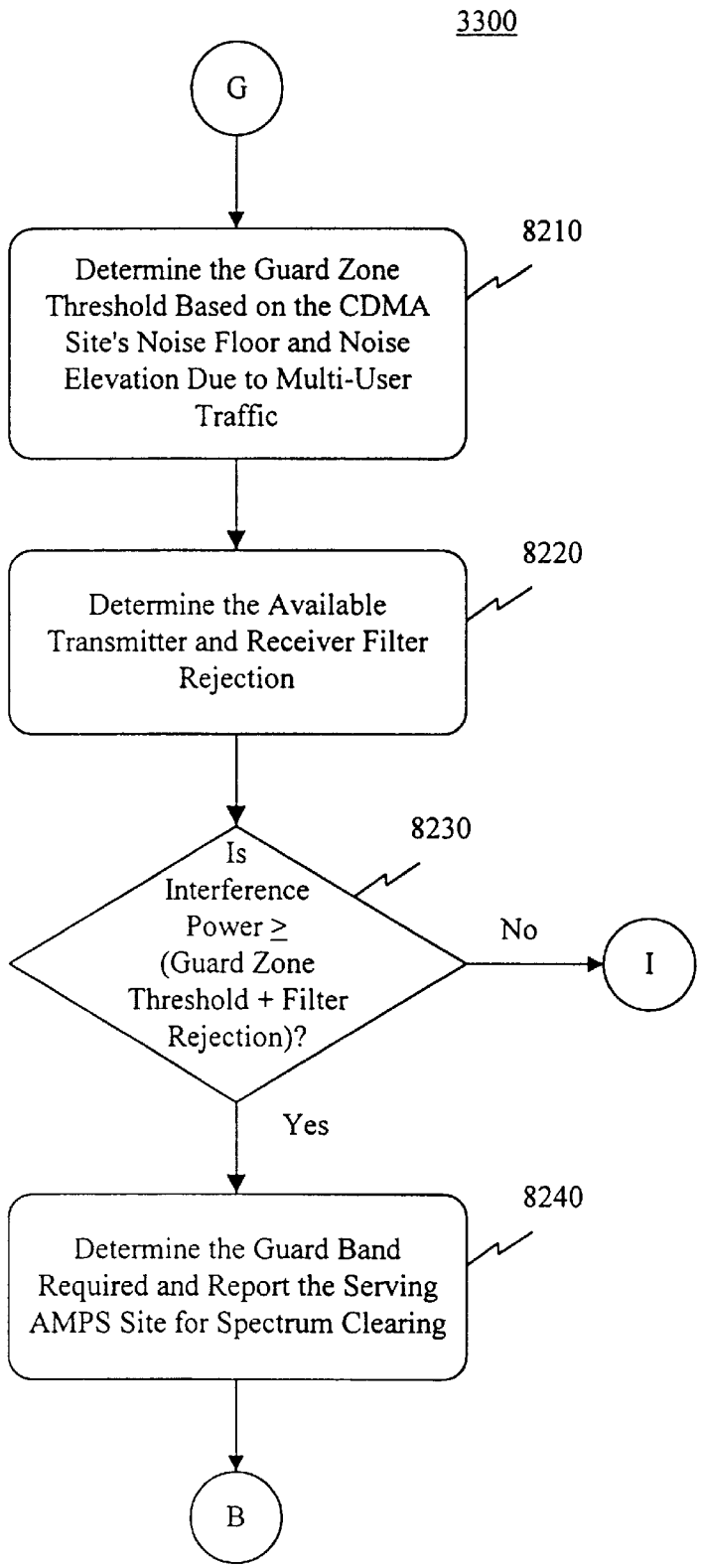

If some of the AMPS mobile units have not been analyzed for interference, module 3300 performs analysis for each AMPS mobile unit in the network [step 8120]. Module 3300 begins the analysis by calculating for a selected AMPS mobile unit, the interference power from the AMPS mobile unit at every CDMA site [step 8130]. For a CDMA site under consideration, module 3300 calculates the guard zone threshold based on the CDMA site's thermal noise floor and the rise above the thermal noise floor due to multi-user traffic [step 8210] (FIG. 8B). Module 3300 then calculates the appropriate transmitter and receiver filter rejection based on the AMPS mobile unit's transmitter mask and the CDMA site's receiver filter characteristics [step 8220].

Next, module 3300 determines whether the AMPS mobile unit causes interference to a CDMA site by determining whether the interference power from the AMPS mobile unit is greater than or equal to the combination of the guard zone threshold and the filter rejection [step 8230]. This determination is expressed as follows:

$$\text{Interference power from AMPS mobile unit} \geq N_s + N_{elev} - F_{CDMA\_S\_RF}(f) - T_{AMPS\_M\_RF}(f) - X\ dB, \quad (3)$$

where $N_s + N_{elev} - X$ dB represents the guard zone threshold for the CDMA site, $N_s$ is the CDMA site's thermal noise floor, $N_{elev}$ is the elevation in the CDMA site's noise floor due to multi-user traffic, $F_{CDMA\_S\_RF}(f)$ is the CDMA site's receiver filter rejection (FIG. 9), and $T_{AMPS\_M\_RF}(f)$ is the AMPS mobile unit's transmitter mask which is assumed ideal and constant across the 30 kHz bandwidth. As in expression (1), the X dB decrease ensures that the resulting elevation in the noise floor of the CDMA site due to the AMPS mobile unit interference is set to a tolerable level.

Figure 9:
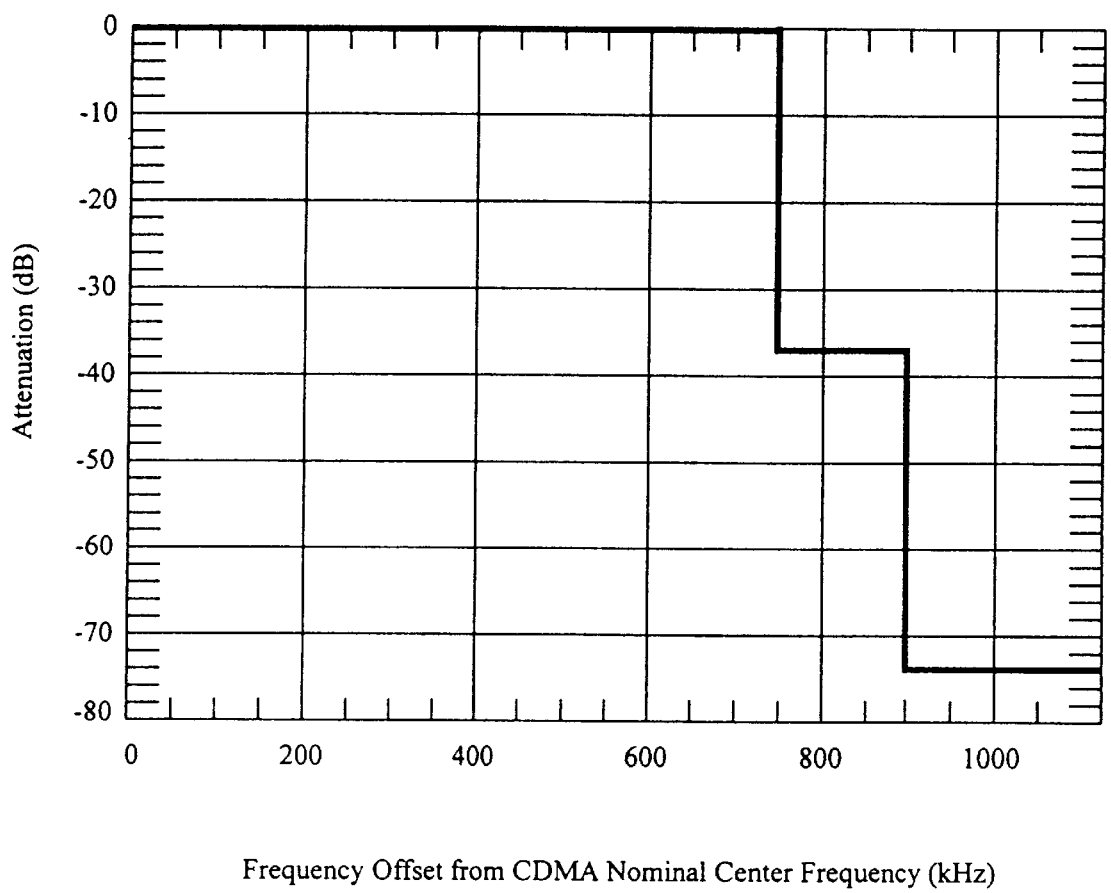
FIG. 9 is a graph depicting a CDMA site's receiver filter characteristics in an implementation consistent with the principles of the present invention.

FIG. 9 is a graph of a CDMA site's receiver filter characteristics in an implementation consistent with the principles of the present invention. The graph shows that the CDMA site's receiver filter response has two breakpoints at approximately 750 kHz and 900 kHz.

If the interference power from the AMPS mobile unit is greater than or equal to the combination of the guard zone threshold and the filter rejection, module 3300 determines the guard band required based on the CDMA site's receiver filter characteristics in FIG. 9, and reports the serving AMPS site for spectrum clearing [step 8240]. Based on the information from FIG. 9, module 3300 determines that the spectrum which needs to be cleared due to this interference could be either Band 1 or Band 2 depending upon the CDMA site's receiver filter's bandpass response. Band 2 is a 1.5 MHz frequency band defined as approximately 750 kHz on either side of the CDMA carrier frequency, and equivalent to approximately 50 AMPS channels. The AMPS mobile unit's out-of-band spurious emissions falling into the CDMA carrier frequency are negligible compared to the AMPS mobile unit's carrier power received by the CDMA site. After reporting the AMPS site for spectrum clearing, module 3300 returns to step 8110 where it determines whether all the AMPS mobile units in the network have been analyzed for interference.

Figure 10A:
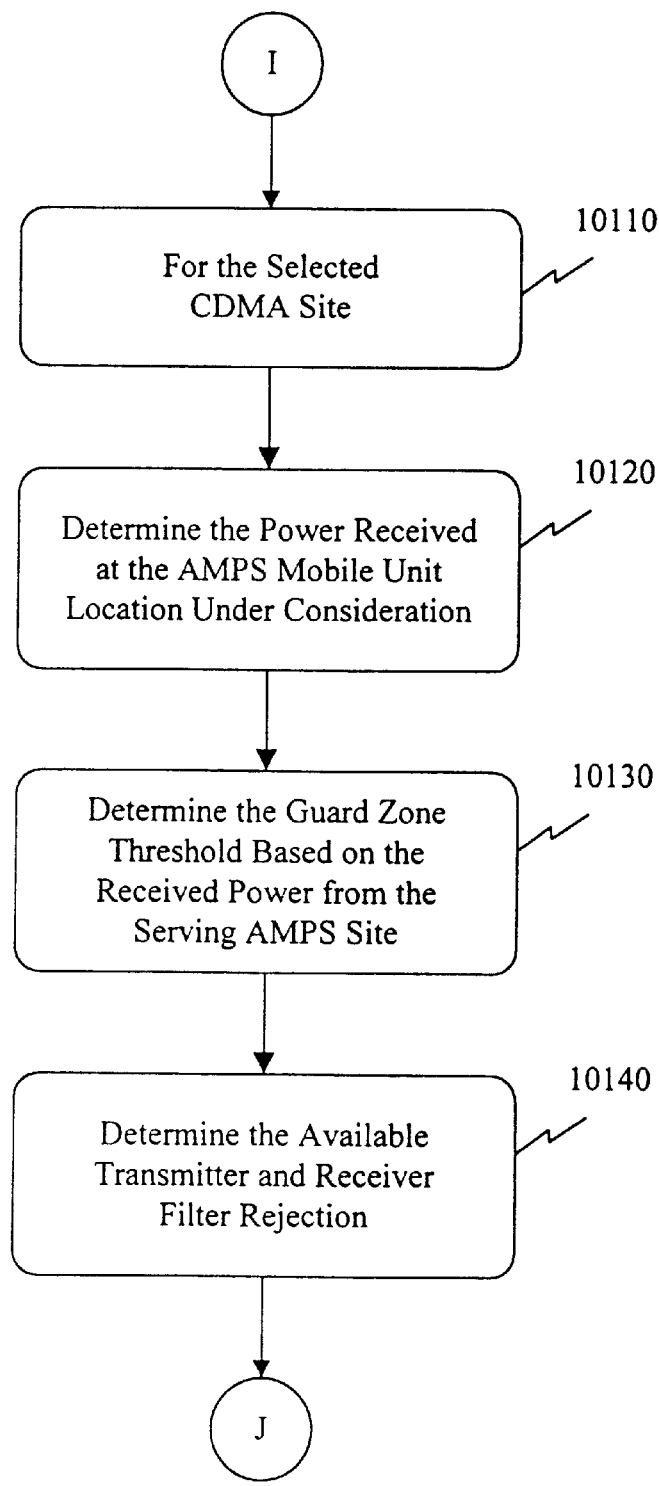
FIGS. 10A and 10B are flow charts of the CDMA site to AMPS mobile unit interference module of FIG. 3.
Figure 10B:
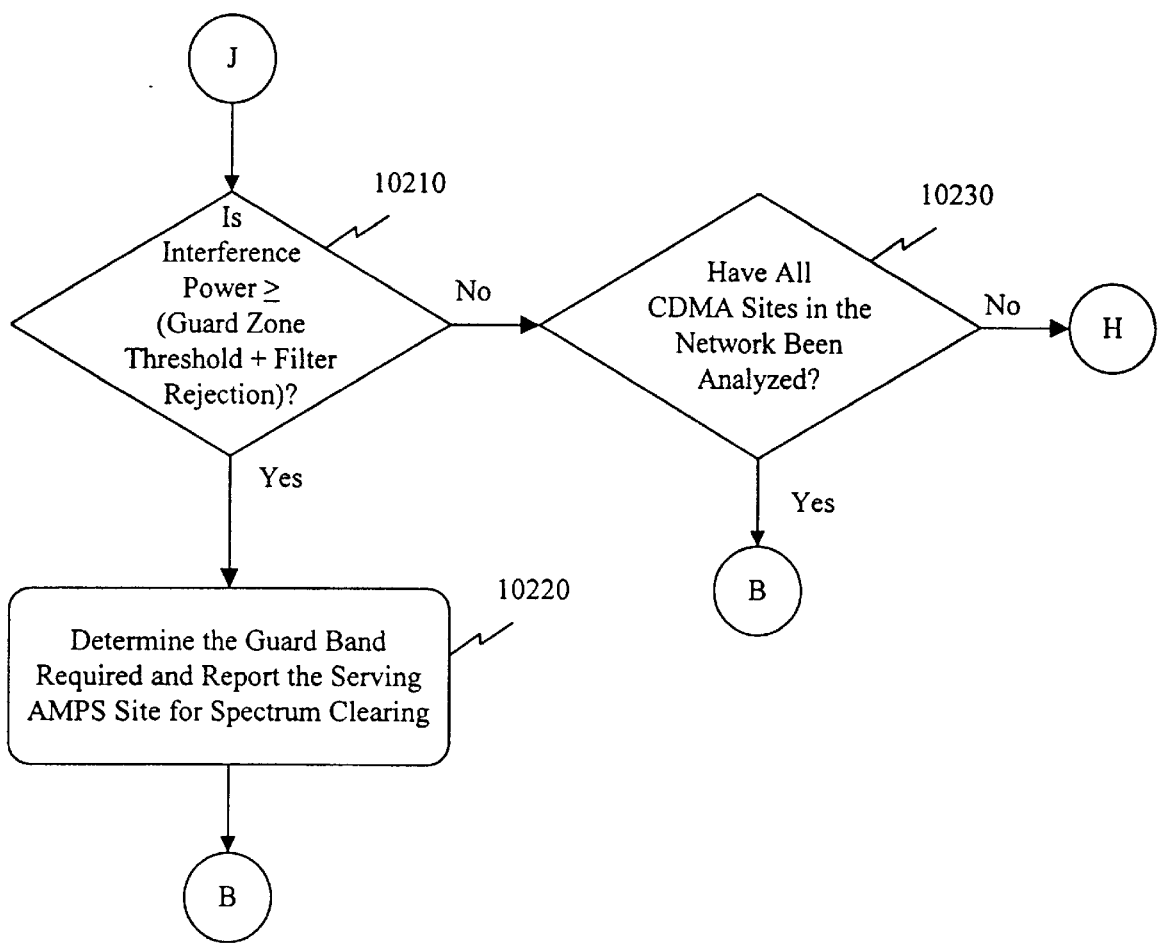

If the interference power from the AMPS mobile unit is less than the combination of the guard zone threshold and the filter rejection, however, module 3300 calls CDMA site to AMPS mobile unit interference module 3400 (FIG. 10A). CDMA site to AMPS mobile unit interference module 3400 performs analysis for each CDMA site in the network [step 10110]. Module 3400 begins the analysis by calculating for the selected CDMA site, the interference power from the CDMA site at every possible AMPS mobile unit location [step 10120]. For the AMPS mobile unit under consideration, module 3400 calculates the guard zone threshold based on the power received by the AMPS mobile unit from its best serving AMPS site [step 10130]. Module 3400 then calculates the appropriate transmitter and receiver filter rejection based on the AMPS mobile unit's receiver filter and the CDMA site's transmitter mask characteristics [step 10140].

Next, module 3400 determines whether the CDMA site causes interference to an AMPS mobile unit by determining whether the interference power from the CDMA site is greater than or equal to the combination of the guard zone threshold and the filter rejection [step 10210]. This determination is expressed as follows:

$$\text{Interference power from CDMA site} \geq P_{received} - F_{AMPS\_M\_RF}(f) - T_{CDMA\_S\_RF}(f) - X\ dB, \quad (4)$$

where $P_{received} - X$ dB represents the guard zone threshold for the AMPS mobile unit, $P_{received}$ is the power received by the AMPS mobile unit from its best serving AMPS site, $T_{CDMA\_S\_RF}$ (f) is the CDMA site's transmitter mask requirement (FIG. 11), $F_{AMPS\_M\_RF}$ (f) is the AMPS mobile unit's receiver filter rejection which is assumed to be ideal and constant across the 30 kHz band, and X, as in expression (1), ensures that the interference is at a tolerable level.

Figure 11:
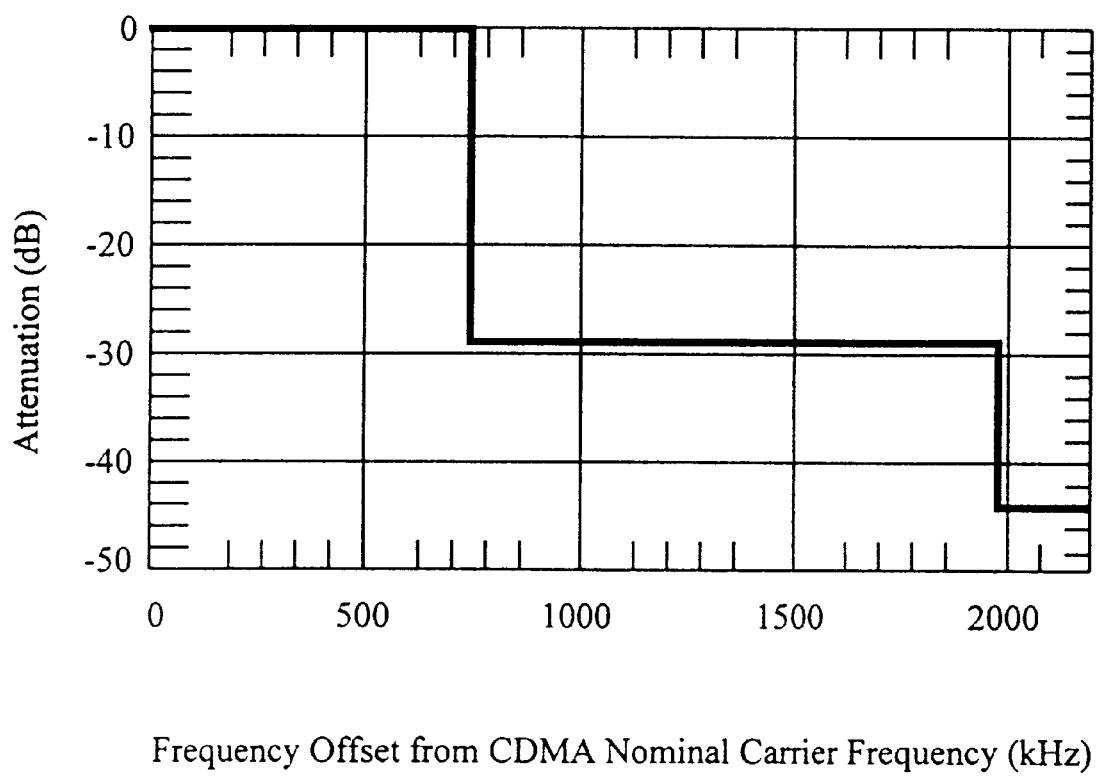
FIG. 11 is a graph depicting a CDMA site's transmitter mask requirement in an implementation consistent with the principles of the present invention.

FIG. 11 is a graph of a CDMA site's transmitter mask requirement in an implementation consistent with the principles of the present invention. The graph shows that the CDMA site's transmitter mask has two breakpoints at approximately 750 kHz and 1980 kHz.

If the interference power from the CDMA site is greater than or equal to the combination of the guard zone threshold and the filter rejection, module 3400 determines the guard band required based on the CDMA site's transmitter mask requirement in FIG. 11, and reports the serving AMPS site for spectrum clearing [step 10220]. Based on the information from FIG. 11, module 3400 determines that the spectrum which needs to be cleared due to this interference could be either Band 1 or Band 2, depending upon the CDMA site's transmitter mask. Module 3400 then calls module 3300 at step 8110 (FIG. 8A), where module 3300 determines whether all of the AMPS mobile units in the network have been analyzed for interference.

If the interference power from the CDMA site is less than the combination of the guard zone threshold and the filter rejection, however, module 3400 determines whether all of the CDMA sites in the network have been analyzed [step 10230]. If some of the CDMA sites have not been analyzed, then module 3400 calls module 3300 at step 8130 (FIG. 8A), where module 3300 determines the power received from the next AMPS mobile unit at the CDMA site.

If all of the CDMA sites have been analyzed, however, module 3400 calls module 3300 at step 8110 (FIG. 8A), where module 3300 determines whether all of the AMPS mobile units in the network have been analyzed for interference. If all of the AMPS mobile units have been analyzed, then the interference analysis method generates a guard zone report listing all of the AMPS sites where the frequency spectrum needs to be cleared. This report might include the AMPS sites' names with their corresponding sector numbers, their type (AMPS only or dual mode), and the amount of spectrum in AMPS channel numbers which needs to be cleared.

The following advantages are realized by the systems and methods consistent with the principles of the present invention:

(1) The order in which analysis is performed reduces processing speed. In the interference analysis method consistent with the principles of the present invention, the order of the analysis was chosen to quickly reduce the number of AMPS sites that have to be considered in the analysis. This reduces the remaining number of AMPS sites and mobile locations that must be investigated for each succeeding evaluation of likely interference.

(2) The interference analysis method consistent with the principles of the present invention addresses all of the mutual interference mechanisms. The method includes four main interference modules that account for even the case where a rogue mobile unit might cause excessive interference or the case where a high elevation base station might cause interference to CDMA portable units. Conventional methods only perform a fraction of this analysis.

(3) The interference analysis method consistent with the principles of the present invention considers CDMA performance in the analysis. Guard zone calculation depends upon the underlying AMPS and CDMA perform. The method considers CDMA network performance and potential areas where the CDMA network is capable of combating interference from analog signals, such as where the portable units have a high forward margin. As a result, the method does not unnecessarily expand the guard zone in cases where the CDMA network can operate with some interference.

(4) By taking into account the underlying CDMA network, the interference analysis method consistent with the principles of the present invention makes allowances for those geographical areas where the CDMA portable unit is in a handoff state, and thus better able to handle interference.

(5) The interference analysis method consistent with the principles of the present invention accounts for traffic distribution of mobile units. The method considers a user-defined traffic map such that if a potential geographical area is defined as having no traffic then the method assumes that there is a low probability that an interfering mobile unit exists at this location. As a result, the number of AMPS sites that need to have some of their spectrum cleared is reduced.

(6) The interference analysis method consistent with the principles of the present invention contains the ability to use automatic thresholds or manual settings. The method allows a user to override the guard zone thresholds calculated within the CDMA network, if desired, and use fixed guard zone thresholds for the CDMA sites and portable units. This may be appropriate for "what-if" scenarios, and in cases where the effect of different levels of interference is investigated.

The systems and methods consistent with the principles of the present invention efficiently determine the AMPS sites lying in the guard zone, and the amount of spectrum which needs to be cleared to reduce interference in a dual mode system.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for analyzing interference in a dual mode system having a digital network overlaid on an analog network, the digital network including a plurality of portable units operating within digital cell sites, and the analog network including a plurality of mobile units operating within analog cell sites, the method comprising the steps of:

measuring an amount of interference caused by and to the portable units;

measuring an amount of interference caused by and to the digital cell sites;

individually comparing the interference amounts to a predetermined threshold;

selecting one of the analog cell sites for spectrum clearing if either of the interference amounts exceeds the predetermined threshold; and determining an amount of spectrum to be cleared from the selected analog cell site.

2. The method of claim 1, wherein the portable unit interference measuring step includes the substeps of determining an amount of interference power from the analog cell sites that is received by each of the portable units, and determining an amount of interference power from the portable units that is received at each of the analog cell sites.

3. The method of claim 1, wherein the portable unit interference measuring step includes the substep of concurrently determining an amount of interference power from the analog cell sites that is received by each of the portable units, and an amount of interference power from the portable units that is received at each of the analog cell sites.

4. The method of claim 2, wherein the digital cell site interference measuring step includes the substeps of determining an amount of interference power from the mobile units that is received at each of the digital cell sites, and determining an amount of interference power from the digital cell sites that is received at each of the mobile units.

5. The method of claim 1, wherein the digital cell site interference measuring step includes the substep of concurrently determining an amount of interference power from the mobile units that is received at each of the digital cell sites, and an amount of interference power from the digital cell sites that is received at each of the mobile units.

6. The method of claim 4, wherein the mobile units to digital cell sites interference power determining step includes the substeps of defining a guard zone threshold based on a noise floor of the digital cell sites, defining available transmitter and receiver filter rejection based on a transmitter mask of the mobile units and receiver filter characteristics of the digital cell sites, and determining the predetermined threshold from the guard zone threshold and the available transmitter and receiver filter rejection.

7. The method of claim 6, wherein the spectrum amount determining step includes the substep of using the receiver filter characteristics of the digital cell sites to determine the amount of spectrum to be cleared from the selected analog cell site.

8. The method of claim 4, wherein the digital cell sites to mobile units interference power determining step includes the substeps of defining a guard zone threshold based on power received by the mobile units from serving ones of the analog cell sites, defining available transmitter and receiver filter rejection based on a receiver filter of the mobile units and transmitter mask characteristics of the digital cell sites, and determining the predetermined threshold from the guard zone threshold and the available transmitter and receiver filter rejection.

9. The method of claim 8, wherein the spectrum amount determining step includes the substep of using the transmitter mask characteristics of the digital cell sites to determine the amount of spectrum to be cleared from the selected analog cell site.

10. The method of claim 2, wherein the analog cell sites to portable units interference power determining step includes the substeps of defining a guard zone threshold based on forward margin, handoff status, and noise floor of the portable units, defining available transmitter and receiver filter rejection based on a transmitter mask of the analog cell sites and receiver filter characteristics of the portable units, and determining the predetermined threshold from the guard zone threshold and the available transmitter and receiver filter rejection.

11. The method of claim 10, wherein the spectrum amount determining step includes the substep of using the receiver filter characteristics of the portable units to determine the amount of spectrum to be cleared from the selected analog cell site.

12. The method of claim 2, wherein the portable units to analog cell sites interference power determining step includes the substeps of defining a guard zone threshold based on a noise floor of the analog cell sites, defining available transmitter and receiver filter rejection based on a receiver filter of the analog cell sites and transmitter mask characteristics of the portable units, and determining the predetermined threshold from the guard zone threshold and the available transmitter and receiver filter rejection.

13. The method of claim 12, wherein the spectrum amount determining step includes the substep of using the transmitter mask characteristics of the portable units to determine the amount of spectrum to be cleared from the selected analog cell site.

14. The method of claim 1, wherein the digital cell site interference measuring step includes the substeps of determining an amount of interference power from the mobile units that is received at each of the digital cell sites, and determining an amount of interference power from the digital cell sites that is received at each of the mobile units.

15. The method of claim 14, wherein the digital cell site interference measuring step further includes the substep of concurrently performing the mobile units to digital cell sites and the digital cell sites to mobile units interference power determining steps.

16. The method of claim 14, wherein the mobile units to digital cell sites interference power determining step includes the substeps of defining a guard zone threshold based on a noise floor of the digital cell sites, defining available transmitter and receiver filter rejection based on a transmitter mask of the mobile units and receiver filter characteristics of the digital cell sites, and determining the predetermined threshold from the guard zone threshold and the available transmitter and receiver filter rejection.

17. The method of claim 16, wherein the spectrum amount determining step includes the substep of using the receiver filter characteristics of the digital cell sites to determine the amount of spectrum to be cleared from the selected analog cell site.

18. The method of claim 14, wherein the digital cell sites to mobile units interference power determining step includes the substeps of defining a guard zone threshold based on power received by the mobile units from serving ones of the analog cell sites, defining available transmitter and receiver filter rejection based on a receiver filter of the mobile units and transmitter mask characteristics of the digital cell sites, and determining the predetermined threshold from the guard zone threshold and the available transmitter and receiver filter rejection.

19. The method of claim 18, wherein the spectrum amount determining step includes the substep of using the transmitter mask characteristics of the digital cell sites to determine the amount of spectrum to be cleared from the selected analog cell site.

20. The method of claim 1, further comprising the step of
inputting information regarding traffic and coverage for both the analog and digital networks prior to performing the measuring steps.

21. The method of claim 20, wherein the inputting step includes the substep of
defining a digital network service area from the traffic and coverage information for the digital network.

22. The method of claim 20, wherein the inputting step includes the substep of
assigning traffic to the analog cell sites using the traffic and coverage information for the analog network.

23. A method for determining whether an analog cell site of an analog network is located in a guard zone of a dual mode system having a digital network overlaid on the analog network, the analog cell site including a plurality of mobile units operating therein, the method comprising the steps of:
measuring an amount of interference caused by and to the analog cell site;
measuring an amount of interference caused by and to the mobile units;
separately comparing the interference amounts to a predetermined threshold; and
determining that the analog cell site is located in the guard zone if either of the interference amounts exceeds the predetermined threshold.

24. The method of claim 23, wherein the digital network includes a plurality of digital cell sites having portable units operating therein; and
wherein the analog cell site interference measuring step includes the substeps of
determining an amount of interference power from the analog cell sites that is received by each of the portable units, and
determining an amount of interference power from the portable units that is received at each of the analog cell sites.

25. The method of claim 24, wherein the analog cell sites to portable units interference power determining step includes the substeps of
defining a guard zone threshold based on forward margin, handoff status, and noise floor of the portable units,
defining available transmitter and receiver filter rejection based on a transmitter mask of the analog cell sites and receiver filter characteristics of the portable units, and
determining the predetermined threshold from the guard zone threshold and the available transmitter and receiver filter rejection.

26. The method of claim 24, wherein the portable units to analog cell sites interference power determining step includes the substeps of
defining a guard zone threshold based on a noise floor of the analog cell sites,
defining available transmitter and receiver filter rejection based on a receiver filter of the analog cell sites and transmitter mask characteristics of the portable units, and
determining the predetermined threshold from the guard zone threshold and the available transmitter and receiver filter rejection.

27. The method of claim 23, wherein the digital network includes a plurality of digital cell sites having portable units operating therein; and
wherein the analog cell site interference measuring step includes the substep of
concurrently determining an amount of interference power from the analog cell sites that is received by each of the portable units, and an amount of interference power from the portable units that is received at each of the analog cell sites.

28. The method of claim 23, wherein the digital network includes a plurality of digital cell sites having portable units operating therein; and
wherein the mobile unit interference measuring step includes the substeps of
determining an amount of interference power from the mobile units that is received at each of the digital cell sites, and
determining an amount of interference power from the digital cell sites that is received at each of the mobile units.

29. The method of claim 28, wherein the mobile units to digital cell sites interference power determining step includes the substeps of
defining a guard zone threshold based on a noise floor of the digital cell sites,
defining available transmitter and receiver filter rejection based on a transmitter mask of the mobile units and receiver filter characteristics of the digital cell sites, and
determining the predetermined threshold from the guard zone threshold and the available transmitter and receiver filter rejection.

30. The method of claim 28, wherein the digital cell sites to mobile units interference power determining step includes the substeps of
defining a guard zone threshold based on power received by the mobile units from serving ones of the analog cell sites,
defining available transmitter and receiver filter rejection based on a receiver filter of the mobile units and transmitter mask characteristics of the digital cell sites, and
determining the predetermined threshold from the guard zone threshold and the available transmitter and receiver filter rejection.

31. The method of claim 23, wherein the digital network includes a plurality of digital cell sites having portable units operating therein; and
wherein the mobile unit interference measuring step includes the substep of
concurrently determining an amount of interference power from the mobile units that is received at each of the digital cell sites, and an amount of interference power from the digital cell sites that is received at each of the mobile units.

32. The method of claim 23, further comprising the step of
inputting information regarding traffic and coverage for both the analog and digital networks prior to performing the measuring steps.

33. The method of claim 32, wherein the inputting step includes the substep of
defining a digital network service area from the traffic and coverage information for the digital network.

34. The method of claim 32, wherein the inputting step includes the substep of
assigning traffic to the analog cell sites using the traffic and coverage information for the analog network.

35. A method for performing guard zone and guard band analysis in a dual mode system having a digital network overlaid on an analog network, the digital network including a plurality of portable units operating within digital cell sites, and the analog network including a plurality of mobile units operating within analog cell sites, the method comprising the steps of:

measuring an amount of interference power from the analog cell sites that is received by each of the portable units;

measuring an amount of interference power from the portable units that is received at each of the analog cell sites;

measuring an amount of interference power from the mobile units that is received at each of the digital cell sites;

measuring an amount of interference power from the digital cell sites that is received at each of the mobile units;

defining first through fourth thresholds respectively corresponding to the measuring steps;

comparing the interference power amounts to the corresponding one of the first through fourth thresholds;

determining that one of the analog cell sites falls within a guard zone if any of the interference power amounts exceeds the corresponding one of the first through fourth thresholds; and determining a guard band corresponding to the one analog cell site.

36. The method of claim 35, wherein the analog cell sites to portable units interference power measuring step includes the substeps of defining a guard zone threshold based on forward margin, handoff status, and noise floor of the portable units, defining available transmitter and receiver filter rejection based on a transmitter mask of the analog cell sites and receiver filter characteristics of the portable units, and determining the first threshold from the guard zone threshold and the available transmitter and receiver filter rejection.

37. The method of claim 36, wherein the guard band determining step includes the substep of using the receiver filter characteristics of the portable units to determine the guard band corresponding to the one analog cell site.

38. The method of claim 35, wherein the portable units to analog cell sites interference power measuring step includes the substeps of defining a guard zone threshold based on a noise floor of the analog cell sites, defining available transmitter and receiver filter rejection based on a receiver filter of the analog cell sites and transmitter mask characteristics of the portable units, and determining the second threshold from the guard zone threshold and the available transmitter and receiver filter rejection.

39. The method of claim 38, wherein the guard band determining step includes the substep of using the transmitter mask characteristics of the portable units to determine the guard band corresponding to the one analog cell site.

40. The method of claim 35, wherein the mobile units to digital cell sites interference power measuring step includes the substeps of defining a guard zone threshold based on a noise floor of the digital cell sites, defining available transmitter and receiver filter rejection based on a transmitter mask of the mobile units and receiver filter characteristics of the digital cell sites, and determining the third threshold from the guard zone threshold and the available transmitter and receiver filter rejection.

41. The method of claim 40, wherein the guard band determining step includes the substep of using the receiver filter characteristics of the digital cell sites to determine the guard band corresponding to the one analog cell site.

42. The method of claim 35, wherein the digital cell sites to mobile units interference power measuring step includes the substeps of defining a guard zone threshold based on power received by the mobile units from serving ones of the analog cell sites, defining available transmitter and receiver filter rejection based on a receiver filter of the mobile units and transmitter mask characteristics of the digital cell sites, and determining the fourth threshold from the guard zone threshold and the available transmitter and receiver filter rejection.

43. The method of claim 42, wherein the guard zone determining step includes the substep of using the transmitter mask characteristics of the digital cell sites to determine the guard zone corresponding to the one analog cell site.

44. A computer program product for analyzing interference in a dual mode system having a digital network overlaid on an analog network, the digital network including a plurality of portable units operating within digital cell sites, and the analog network including a plurality of mobile units operating within analog cell sites, the computer program product comprising:

an analog cell site to portable unit interference module configured to determine interference caused by the analog cell sites to the portable units;

a portable unit to analog cell site interference module configured to determine interference caused by the portable units to the analog cell sites;

a mobile unit to digital cell site interference module configured to determine interference caused by the mobile units to the digital cell sites; and a digital cell site to mobile unit interference module configured to determine interference caused by the digital cell sites to the mobile units.

45. The computer program product of claim 44, wherein the analog cell site to portable unit interference module includes means for determining an amount of interference power from the analog cell sites that is received by each of the portable units, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

46. The computer program product of claim 44, wherein the portable unit to analog cell site interference module includes means for determining an amount of interference power from the portable units that is received at each of the analog cell sites, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

47. The computer program product of claim 44, wherein the mobile unit to digital cell site interference module includes means for determining an amount of interference power from the mobile units that is received at each of the digital cell sites, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

48. The computer program product of claim 44, wherein the digital cell site to mobile unit interference module includes means for determining an amount of interference power from the digital cell sites that is received at each of the mobile units, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

49. A system for analyzing interference in a dual mode system having a digital network overlaid on an analog network, the digital network including a plurality of portable units operating within digital cell sites, and the analog network including a plurality of mobile units operating within analog cell sites, the system comprising:

an analog cell site to portable unit interference element configured to determine interference caused by the analog cell sites to the portable units;

a portable unit to analog cell site interference element configured to determine interference caused by the portable units to the analog cell sites;

a mobile unit to digital cell site interference element configured to determine interference caused by the mobile units to the digital cell sites; and a digital cell site to mobile unit interference element configured to determine interference caused by the digital cell sites to the mobile units.

50. The system of claim 49, wherein the analog cell site to portable unit interference element includes means for determining an amount of interference power from the analog cell sites that is received by each of the portable units, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

51. The system of claim 49, wherein the portable unit to analog cell site interference element includes means for determining an amount of interference power from the portable units that is received at each of the analog cell sites, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

52. The system of claim 49, wherein the mobile unit to digital cell site interference element includes means for determining an amount of interference power from the mobile units that is received at each of the digital cell sites, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

53. The system of claim 49, wherein the digital cell site to mobile unit interference element includes means for determining an amount of interference power from the digital cell sites that is received at each of the mobile units, means for comparing the interference power amount to a predetermined threshold, means for selecting one of the analog cell sites for spectrum clearing if the interference power amount exceeds the predetermined threshold, and means for determining an amount of spectrum to be cleared from the selected analog cell site.

* * * * *